Feb. 9, 1937. H. A. KULJIAN 2,069,959
LIQUID LEVEL RESPONSIVE DEVICE
Filed Dec. 9, 1931 2 Sheets-Sheet 1

WITNESS:
Rob R Kitchel

INVENTOR
Harry A. Kuljian
BY
Augustus B Stoughton
ATTORNEY.

Feb. 9, 1937.   H. A. KULJIAN   2,069,959
LIQUID LEVEL RESPONSIVE DEVICE
Filed Dec. 9, 1931   2 Sheets-Sheet 2

INVENTOR
Harry A. Kuljian
BY
Augustus B. Stoughton.
ATTORNEY.

WITNESS:
Robt R Mitchel.

UNITED STATES PATENT OFFICE 2,069,959

LIQUID LEVEL RESPONSIVE DEVICE

Harry A. Kuljian, Philadelphia, Pa.

Application December 9, 1931, Serial No. 579,839

6 Claims. (Cl. 177—351)

The principal object of the present invention is to provide a simple, reliable, accurate, compact and comparatively inexpensive device responsive to changes in liquid level in a boiler, tank or the like, and adapted to indicate liquid level changes at a distant point, or to control a feed or other valve, or both.

Generally stated, the invention comprises a tubular column or straight upright tube adapted for communication with a liquid above and below the changing level thereof, a float device provided with a soft iron core arranged inside of said tube or column, coils receiving alternating current and mounted on the outside of the part of said column or straight tube in which the core is located, whereby the self induction in one of the coils will increase and the self induction in the other coil will decrease as the core moves, and means for transmitting and utilizing these variations.

The invention, generally stated, also comprises a tube or column of the character described in which the float device is solid and includes a core carrying rod arranged in the tube or column and is balanced by a liquid denser than the liquid to the level of which the float is responsive.

The invention also comprises the improvements to be presently described and finally claimed.

In the following description reference will be made to the accompanying drawings forming part hereof and in which Figure 1 is a diagrammatic view, principally in vertical section, illustrating a liquid level device in normal position and responsive to boiler level and embodying features of the invention and arranged to indicate boiler level at a distant point and to control feed input.

Figure 1:
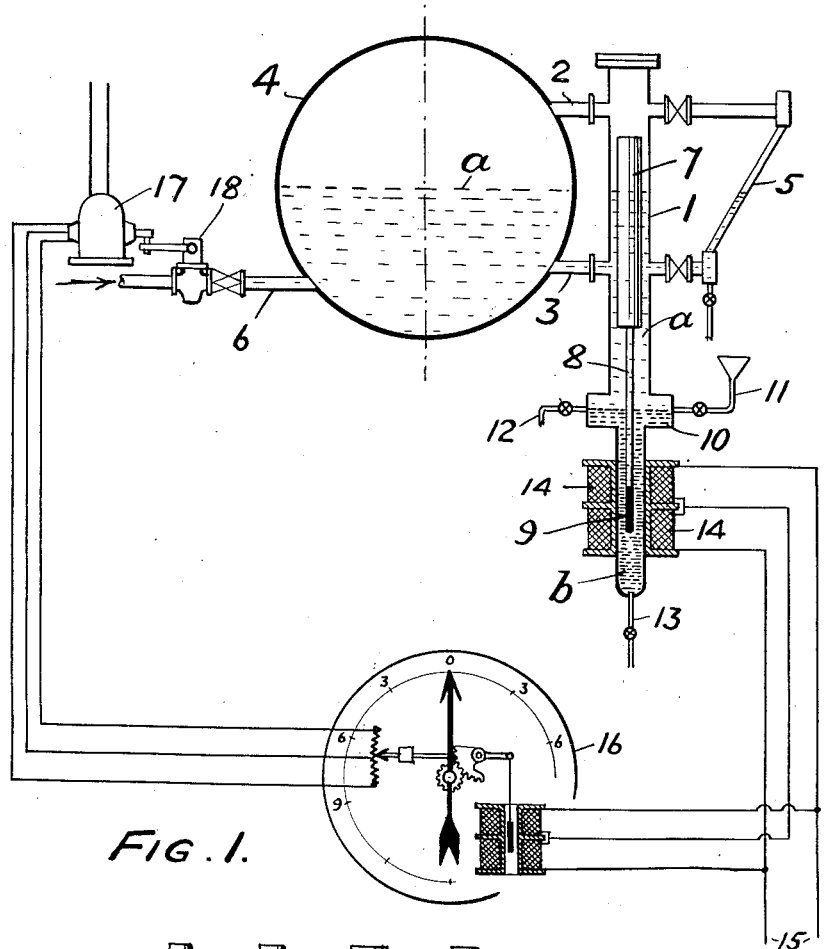

Referring to the drawings and more particularly to Fig. 1, I indicates a substantially nonmagnetic high electrical resistance straight tube or tubular column communicating with a liquid a, above and below the changing level thereof by pipes 2 and 3. 4 indicates a boiler, 5 a sight level gauge, and 6 a feed inlet to the boiler. 7 is a solid float, and it is equipped with a rod 8 confined in the straight tube or column 1. Upon the rod is a soft iron core 9. The float system comprising the float 7, the rod or shaft 8, and the core 9, is balanced by liquid b, denser than the liquid a and confined within the lower portion of the tube or column 1.

Assuming the liquid a to be water, the liquid b is mercury and the core 9 is submerged in it. The level of the mercury is preferably substantially constant and for the attainment of that result the diameter of the column or tube 1 may be enlarged as at 10, so that as the rod 8 is more deeply submerged the displaced mercury is accommodated in the enlargement without substantial rise in level. 11 and 12 are means for filling the lower portion of the tube or column with mercury to the desired level. 13 is a valved drain connection. 14 indicates coils receiving alternating current as at 15 and they are mounted on the outside of the part of the tube or column 1, in which the coils are located, so that the self-induction in one of the coils will increase and the self-induction in the other coil will decrease as the core moves up and down from its position which corresponds to normal level of the liquid a, in the boiler tank or container 4. The variations in self-induction of the coils 14 are availed of for actuating the indicator 16 which may be distant from the element 4, and which shows the level of the liquid a in the element 4.

Figure 2:
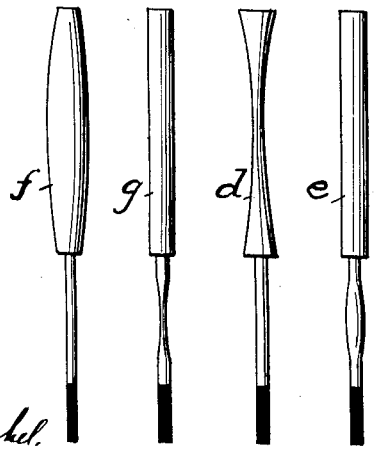
Fig. 2 is a view illustrative of float rods of different forms and useful in connection with the device shown in Fig. 1.

Sometimes it is desirable to provide a relatively smaller reading or movement at the middle of the scale of the indicator 16 and sometimes at the ends of the scale. The form of the float and rod shown at d and e in Fig. 2 produces relatively smaller readings in the middle than at the ends of the scale, and the forms shown at f and g produce the reverse of those readings.

The variation in self-inductance in the coils 14 may be applied to the control of the feed input. One way of doing this is to utilize the movement of the pointer of the indicator to control the circuit of a step by step or throttling forward and reverse motor 17 which actuates the valve 18 in the feed line 6.

Figure 3:
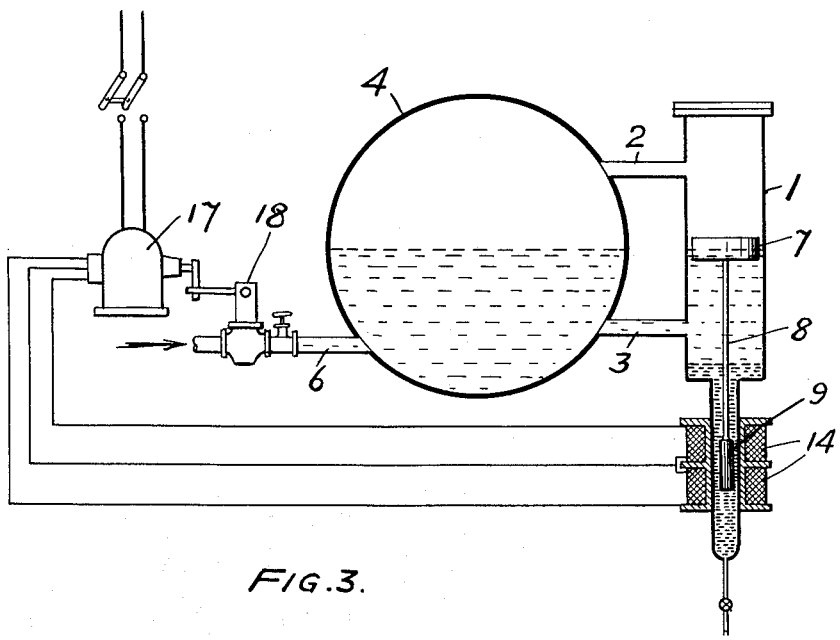
Fig. 3 is a view similar to Fig. 1 and illustrating a modification.

The construction and mode of operation of the modification shown in Fig. 3 are as above described, except that variations in the coils 14 are applied direct to the motor 17 and the indicator is omitted.

While the tube or column 1 is axially straight its diameter may be uniform, or its diameter may not be uniform as has been indicated at 10, or the upper or lower part of it may be reduced for enclosure of the straight rod or shaft 8 as indicated in Fig. 3.

The liquid or fluid a, is less dense than the liquid or fluid b, and the float system includes the element 7 projecting above the level of the liquid a, and the rod 8 submerged in both liquids. From this construction and arrangement it follows that a comparatively large change of level, or rising or falling movement of the surface of the liquid a, produces a relatively small movement of the core 9 and the extent of the movement of the core 9 can be controlled or fixed by changing the form and size of the rod 8. In further explanation it may be said that if the level of the less dense liquid *a*, falls, it tends to uncover the float 7, which thereby becoming heavier gradually sinks the rod 8 and coil 9 downwards into the denser liquid *b*, for a very short distance in comparison with the extent of fall of surface of the liquid *a*; and if the level of the liquid rises the described operation is reversed.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. In a liquid level responsive device the combination of a single column having therein liquids of different densities, a float in said liquids and the bulk of the upper portion of the float above the normal level of the denser liquid in respect to the bulk of the lower portion of the float below that level being sufficient when the upper part is additionally and diminishingly immersed in the denser liquid, to add and subtract substantial increments to and from the total volume of the lower part, whereby the travel of the submerged part of the float is comparatively small in respect to the travel of the surface of the liquid of less density.

2. In a liquid level responsive device the combination of a single column having therein liquids of different densities, a float in said liquids and the bulk of the upper portion of the float above the normal level of the denser liquid in respect to the bulk of the lower portion of the float below that level being sufficient, when the upper part is additionally and diminishingly immersed in the denser liquid, to add and subtract substantial increments to and from the total volume of the lower part, whereby the travel of the submerged part of the float is comparatively small in respect to the travel of the surface of the liquid of less density, an iron core mounted directly on the lower part of the float, stationary coils mounted on the column adjacent said core and responsive to a shorter movement of said core than the travel of the surface of the liquid of less density, a source of alternating current for the coils, and means for transmitting and utilizing the variations in the inductance in said coils due to changes of position of the core.

3. In a liquid level responsive device the combination of a single column having therein fluids of different densities, a float extending above the surface of the fluid of less density and provided with a rod having its lower end submerged in the liquid of greater density and provided with a core, the bulk of the upper portion of the rod above the normal level of the denser liquid in respect to the bulk of the lower portion of the rod and the core below that level being sufficient, when the upper part is additionally and decreasingly immersed in the denser liquid to add to and subtract substantial increments to and from the total volume of the lower part of the rod and core, whereby the travel of the submerged part of the rod and core is comparatively small in respect to the travel of the surface of the liquid of less density, stationary coils mounted on the column adjacent the core and responsive to a shorter movement of said core than the travel of the surface of the liquid of less density, a source of alternating current for the coils, and means for transmitting and utilizing the variations in the inductance in said coils to changes of position of the core.

4. In a liquid level responsive device the combination of a single column having therein liquids of different densities, a float extending above the surface of the liquid of less density and provided with a rod having its lower end submerged in the liquid of greater density and provided with a core, the bulk of the upper portion of the rod above the normal level of the denser liquid in respect to the bulk of the lower portion of the rod and the core below that level being sufficient, when the upper part is additionally and decreasingly immersed in the denser liquid, to add and subtract substantial increments to and from the total volume of the lower part of the rod and core, whereby the travel of the submerged part of the rod and core is comparatively small in respect to the travel of the surface of the liquid of less density, and means including a remote indicator for exhibiting the position of said core, comprising an impedance balance having a pair of coils exterior to the column at the location of the core, whereby the movement of the core is substantially less than that of the surface of the liquid of less density and is within the effective range of the adjacent coils of the impedance balance.

5. A water level indicating device comprising a water column for connection with a boiler or the like, wherein the water level is subject to a considerable range of fluctuation, said column having at the bottom thereof a dead end, mercury in the bottom of said column beneath the water in said column, a displacement member received in said column to operate therein a core of magnetizable material in said column and connected to said displacement member, the specific gravity of said displacement member and of said core being proportioned to the specific gravity of the water and of the mercury to produce in said member and said core a resultant differential movement proportional in reduced ratio to changes of water level in the column, and means including a remote indicator for exhibiting the position of said core, comprising an impedance balance having a pair of coils exterior to the column at the location of the core, whereby the movement of the core is substantially less than that of the water level and is within the effective range of the adjacent coils of the impedance balance.

6. A liquid level indicating device comprising a liquid column for connection with a boiler or the like, wherein the liquid level is subject to a considerable range of fluctuation, said liquid column having at the bottom thereof a dead end, mercury in said column beneath the liquid therein, a displacement member received in said column to operate therein, a core of magnetizable material in said column and connected to said displacement member, the densities of said displacement member and of said core being proportioned to the densities of said liquid and the mercury to produce a resultant movement of said displacement member and said core proportional in reduced ratio to changes of liquid level in said column, and means including a remote indicator for exhibiting the position of said core, comprising an impedance balance having a pair of coils exterior to the column at the location of the core, whereby the movement of the core is substantially less than that of the liquid level and is within the effective range of the adjacent coils of the impedance balance.

HARRY A. KULJIAN.